United States Patent Office 3,362,381
Patented Jan. 9, 1968

3,362,381
CRYOGENIC BRANDING OF ANIMALS
Roy Keith Farrell, Pullman, Wash., assignor to Research Corporation, New York, N.Y., a corporation of New York
No Drawing. Filed Mar. 24, 1967, Ser. No. 625,606
8 Claims. (Cl. 119—1)

ABSTRACT OF THE DISCLOSURE

Living animals are marked by applying to selected portions of the skin of the animal a supercooled material, such as a supercooled refrigerant or branding iron, for a sufficient time to freeze such related portion. Animal hides having selected portions of altered pigmentation or hair loss for identification or decorative purposes may be produced.

---

This application is a continuation-in-part of our copending application Ser. No. 534,439, filed Mar. 15, 1966, and now abandoned, entitled, "Cryogenic Branding of Animals." A non-exclusive, irrevocable, non-transferable, royalty-free license in the invention herein described, throughout the world for all purposes of the Government of the United States of America, with the power to grant sublicenses for such purposes, is hereby granted to that Government.

This invention relates to a relatively painless method for permanently marking an animal, particularly a dark-colored animal, so as to provide visible means for its identification.

In particular, the invention relates to a cryogenic (supercold) branding technique which is not painful, when compared with the "hot brand" method, and which, when carefully controlled, results in minimal damage to the hide itself.

The effects of the new technique are dramatic in darker-colored animals in which a regrowth of white hair, as well as a loss of dark skin pigmentation, occurs and may be readily observed. White animals can also be marked by the technique, with the same advantages of minimal hide damage and greatly reduced pain to the animals as with darker animals.

In general, in accordance with the method of the invention, the marking, or branding, is accomplished by the direct application of a superchilled material, in the shape of the desired identification mark, to the skin of the animal. This may be carried out by a variety of techniques including the application to the skin surface of a superchilled metal brand, of solid $CO_2$ (Dry Ice) supercooled refrigerant, of cold $CO_2$ gas, and by the volatilization of butane or other liquid petroleum products or any of the common fluorocarbon refrigerants, or liquid nitrogen on the skin surface. The material employed has little effect on the outcome if the skin is adequately frozen. Refrigerants or refrigerated metals at temperatures as high as about $-30°$ C. are effective in carrying out the method of the invention.

Solid refrigerants, such as Dry Ice, may be applied to the skin in the firm preformed shapes while liquid or gaseous refrigerant materials may be applied with applications having suitably arranged outlet apertures to direct the refrigerant material into contact with the skin in the desired shape or pattern.

For greater uniformity of results clipping of hair at the area of application is recommended.

The immediate effect of the application of the chilled material to the skin surface of the animal is edema, erythema and hair loss, together with some epithelial damage, at the site of application. Subsequently, a growth of white hair, in the shape of the branding implement used, as well as depigmentation of the skin, typically occurs at the brand site, although, if the application of cold is carried to the point of destruction of the hair follicles there will be no regrowth of hair. Such follicle destruction, with the production of selected areas of bare skin, is particularly effective in the marking of light colored animals. Loss of hair lasting as long as eight months has been found to occur when copper branding tools cooled in liquid nitrogen are applied to the skin for sixty seconds.

The method of the invention is useful not only for producing visible identifying marks, e.g., brands, numbers, letters, etc., but may also be used for aesthetic purposes, as for example, to remove unwanted pigmentation or hair as well as to create attractive designs on the animal or on the eventual hide or both.

The following examples are illustrative of the invention:

EXAMPLE 1

A black dog was branded with a horn brand (the letter H) chilled in a Dry Ice-alcohol bath. Edema, erythema and hair loss, together with some epithelial damage, was observed at the brand site. Observation of the dog 30 days later revealed white hair growing in the shape of an "H" at the brand site.

EXAMPLE 2

A black cat was branded on two sites, one anterior and one posterior, with a piece of copper pipe, $2\frac{3}{8}"$ long by $1\frac{5}{6}"$ in diameter with a wall thickness of $\frac{1}{4}"$, which had been chilled in a Dry Ice-alcohol bath. The brands were applied after clipping, and the skin was set with ethanol before application of the pipe. The pipe was held in contact with the skin for 10 seconds on the anterior site and for 5 seconds on the posterior site. The same effects were observed as in the case of the dog in Example 1, above.

EXAMPLE 3

A black dog was branded as in Example 2, above, on six sites, the pipe being held in contact with the skin for times of 5, 10, 20 and 40 seconds.

As in Example 2, above, white hair, in the shape of six circles, subsequently grew back at the six brand sites.

EXAMPLE 4

A Hereford cow was branded with the numbers "004." The branding irons were flat-faced and cooled in liquid nitrogen. There was no wetting of the skin surface with alcohol or acetone prior to branding.

As in Examples 1–3, above, white hair, in the shape of the numbers "004" subsequently grew at the brand sites.

I claim:

1. A method of permanently branding living domesticated animals which comprises applying in a predetermined configuration representing insignia to a selected portion of the living animal, said selected portion having normal length hair and normal skin, a supercooled material for a sufficient time to freeze such selected portion and permanently alter the appearance thereof.

2. A method as defined in claim 1 wherein the hair pigmentation of the selected portion of the skin is altered.

3. A method as defined in claim 1 wherein the hair on the selected portion is at least temporarily eliminated.

4. A method as defined in claim 1 in which the supercooled material is a refrigerant.

5. A method as defined in claim 1 in which the supercooled material is a branding iron.

6. An animal hide having at least one selected portion of altered appearance produced by the method of claim 1.

7. An animal hide having at least one selected portion of reduced pigmentation produced by the method of claim 1.

8. An animal hide having at least one selected hairless portion produced by the method of claim 1.

References Cited

UNITED STATES PATENTS

| | | | |
|---|---|---|---|
| 896,454 | 8/1908 | Marsden | 158—15 |
| 1,101,616 | 6/1914 | Christiansen | 158—16 |
| 1,527,270 | 2/1925 | Peterson | 158—14 |
| 2,536,001 | 12/1950 | Chase | 62—293 |
| 2,645,097 | 7/1953 | Posch | 62—293 |
| 2,982,112 | 5/1961 | Keyes | 62—293 |
| 3,190,081 | 6/1965 | Pytryga | 128—303.1 X |
| 3,259,131 | 7/1966 | Kanbar et al. | 128—303.1 |
| 3,272,203 | 9/1966 | Chato | 128—303.1 |

OTHER REFERENCES

A. Cecil Taylor, Journal of Experimental Zoology (1949), "Survival of Rat Skin and Changes In Hair Pigmentation Following Freezing," pp. 77–111.

ALDRICH F. MEDBERY, *Primary Examiner.*